Aug. 27, 1974 M. F. BUTLER ET AL 3,832,195
PETALITE-SPODUMENE-POTASSIUM SILICATE CEMENT FOR
BONDING METAL TO GLASS
Filed June 16, 1972

3,832,195
PETALITE - SPODUMENE - POTASSIUM SILICATE CEMENT FOR BONDING METAL TO GLASS
Miles F. Butler, 67 Perry Ave., Corning, N.Y. 14830, and John T. Corcia, 43 Tall Meadow Spring Pond, Painted Post, N.Y. 14870
Filed June 16, 1972, Ser. No. 263,683
Int. Cl. C04b 35/16
U.S. Cl. 106—74                2 Claims

ABSTRACT OF THE DISCLOSURE

This invention is concerned with the production of a cement which is singularly suitable for bonding metal to glass. More particularly, this invention provides a cement consisting essentially of petalite, spodumene, and potassium silicate which is quick setting at ambient temperatures, exhibits good green and fired strength, and is capable of being used at temperatures up to 800° C. with no apparent degradation.

---

Figure 1:
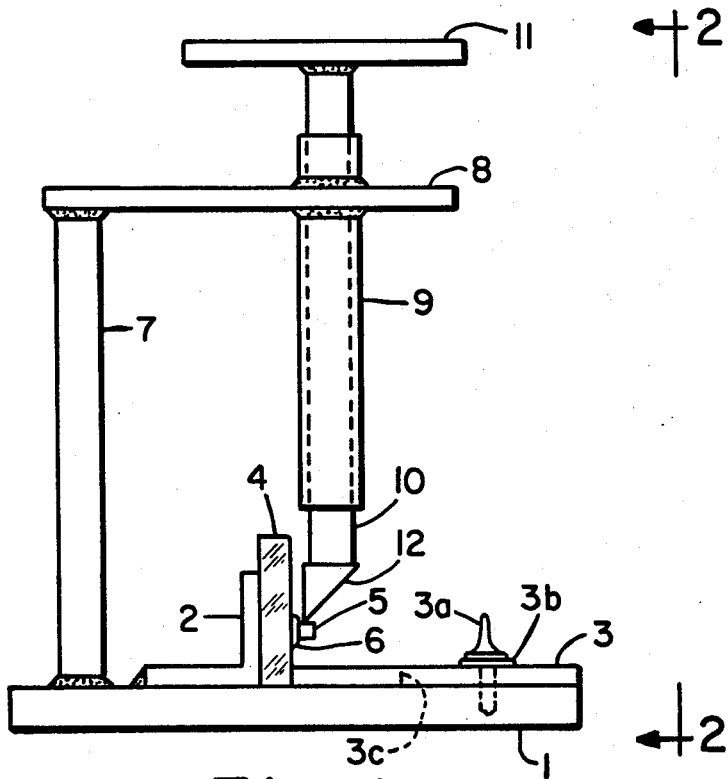

The use of glass in the electrical and electronic fields of application has been widespread first because of the insulating properties thereof and, more recently, because of the semiconducting characteristics which have been imparted thereto. In all this effort, one area of constant concern and source of continued research has been the sealing of metal elements to the glass members. This situation has been particularly acute in those applications where the metal elements have been of substantial bulk and/or where the glass or metal cannot be heated to high temperatures to permit fusion together of the glass and metal. In such instances, a cement has been employed which will bond to the metal and glass, thereby yielding an integral composite unit.

The desired cement would be quick setting, display good green strength to permit relatively carefree handling before firing, have a relatively low firing temperature, viz., less than about 450° C., and exhibit high bonding strength after firing. For some applications, the capability of use at very elevated temperatures, i.e., up to about 800° C., would also be of great interest. These desiderata have been achieved in cements composed of a combination of petalite and spodumene with aqueous potassium silicate as the binder.

In broad terms, the present invention contemplates cements consisting essentially of about 50–85% by weight of petalite+spodumene, wherein the ratio of petalite to spodumene ranges between about 10:1 to 1:10, 5–25% potassium silicate, and 10–40% $H_2O$. Such cements develop green strengths at or slightly above room temperature (20°–40° C.) which are more than adequate to survive conventional handling in no more than about 10 minutes (shear strengths greater than 75 p.s.i.) and can exhibit shear strengths in excess of about 1000 p.s.i. when fired at temperatures no higher than 400° C. for times as short as 30 minutes. This latter capability is valuable inasmuch as it permits the cements to be used with relatively soft glass, i.e., low melting temperature glasses, without hazarding the deformation thereof during the firing step. Longer firing times (e.g., 1–8 hours) and higher temperatures (perhaps up to 700°–800° C.) can be employed, of course, and some improvement in strength therefrom can be observed. However, such practice loses the advantages inherent in these cements of low firing temperatures for short periods of time. Finally, although these cements develop high field strengths at relatively low temperatures, service at temperatures up to 800° C. has been possible without serious degradation.

It can be appreciated that the setting time is a feature of the amount of equeous potassium silicate employed as the binder. Hence, water is necessary to blend together the cement components and permit the ready application thereof to the articles to be sealed together. The potassium silicate gels and sets up as the water evaporates therefrom. Therefore, sufficient water is required to impart the desired consistency to the cement batch depending upon the sealing application contemplated. Thus, the batch can vary from a fluid slurry to a slightly dampened mixture of refractory powders. Nevertheless, we have learned that a water content of at least about 10% by weight is necessary to insure thorough wetting of the particulate material with consequent homogeneous bonding. Amounts greater than about 40% by weight lead to a very fluid slurry which is awkward in handling and, furthermore, the setting time is greatly increased.

Whereas potassium silicate in particulate form can constitute one ingredient of the batch and water can be blended into a mixture of the three essential batch components, it has been found more practical to add the potassium silicate in the form of an aqueous solution. Such practice has generally resulted in securing uniformity of bond both in the green and in the fired body. In general, a true aqueous solution of potassium silicate is to be preferred to assure homogeneity of bonding although colloidal solutions and even suspensions can be employed but bond strength may suffer.

Several aqueous potassium silicate solutions which are useful in the instant invention are listed in the following table. The three recorded below are marked by Philadelphia Quartz Company, Philadelphia, Pa. under the trademark Kasil®.

| Product | Weight percent— | | | Ratio $SiO_2:K_2O$ |
|---|---|---|---|---|
| | $K_2O$ | $SiO_2$ | $H_2O$ | |
| Kasil #1 | 8.30 | 20.8 | 70.9 | 2.5 |
| Kasil #88 | 9.05 | 19.9 | 71.05 | 2.2 |
| Kasil #6 | 12.50 | 26.3 | 61.2 | 2.1 |

Inasmuch as the $K_2O$ content behaves as a flux, overall higher refractoriness will be obtained with high $SiO_2:K_2O$ ratios. Hence, in light of that factor, the Kasil #1 solution is to be preferred. However, the lower $SiO_2:K_2O$ ratios appear to develop strength more rapidly although the final values after several hours firing appear to be comparable with each product. Therefore, from the point of view of other refractoriness and rapid setting, we have found Kasil #88 to provide an optimum combination.

A mixture of petalite and spodumene has been found necessary to achieve good bonding between metals and glass. Thus, the inclusion of petalite insures excellent adherence to metal while the presence of spodumene promotes adherence to glass. Hence, a ratio of petalite to spodumene of about 1:1 is preferred although satisfactory bonding has been developed where the ratio has ranged from about 1:10 to 10:1 by weight. The petalite and spodumene should be employed in grain sizes at least passing a 100 mesh screen (149 microns) and, preferably, passing a 200 mesh screen (74 microns) to promote reactivity between the particles and the potassium silicate.

A minor amount of sodium silicate can be substituted for the potassium silicate. Such a substitution reduces the cost of the cement but also introduces the consequent disadvantages of lower refractoriness and a fluxing action on the glass, this latter action frequently leading to the production of checks in the glass. Therefore, it is much to be preferred that, if such a substitution is made at all, the amount should not exceed about 20% of the $K_2O$.

Minor amounts of other refractory filler materials such as sand, $Al_2O_3$, zircon, MgO, $ZrO_2$, dolomite, clay, feldspar, etc., can be included in the mixture of petalite and spodumene with no apparent serious deleterious effect upon long time bonding strength. Nevertheless, the total of all such additions ought not to exceed about 25% by weight of the petalite-spodumene mixture in order to insure that the reactivity between that mixture and the potassium silicate is not adversely affected. This is seen in a reduction in early strength.

The following examples are illustrative of the process and product parameters of the invention:

EXAMPLE I

One hundred grams of —200 mesh petalite and 100 grams of —200 mesh spodumene were mixed together for 15 minutes. One hundred grams of Kasil #88 solution were added and blended into the mixture for 15 seconds. A reasonably uniform layer of this mixture of about 1/16" in depth was applied to one facing of stainless steel cylindrical discs having the dimensions of about 1/4" diameter and a height of about 1/8". The coated discs were immediately placed into contact with the surface of a glass square at room temperature having dimensions of about 2"x2"x1/2". The cement appeared dry to the touch after less than 30 seconds and did not move around on the glass square even with moderate vibration thereof. The particular glass employed was Corning Code 9041, an alkali metal strontium silicate glass used in the production of faceplates for television tubes and encompassed within the compositions recited in U.S. Pat. No. 3,464,932. The table below records various treatments to which different samples were subjected and the shear strength developed as tested in the assembly represented in the appended drawings.

Figure 2:
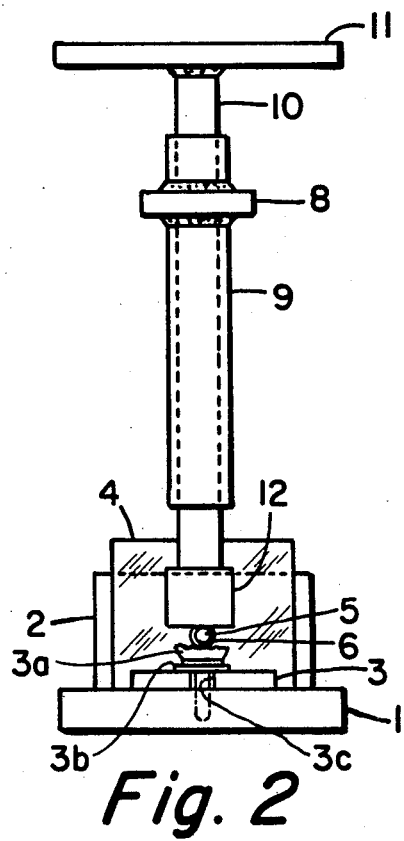

FIG. 1 is a side view and FIG. 2 is taken on line 2—2 of FIG. 1 showing the testing jig which consists of a base 1, bracket 2 welded thereto, and a slidably-adjustable bar 3 attached to base 1 through slot 3C. Bracket 2 and bar 3 cooperate to form a vice for securely holding glass square 4. A stainless steel (or other metal) disc 5 is bonded to glass square 4 by means of cement coating 6. Also attached to base 1 is an upright support member 7 to which is secured a horizontal bracket 8. A sleeve 9 passes through an opening in bracket 8 and is attached to bracket 8. A vertical arm 10 slidably passes through sleeve 9 and carries a platform 11 at the top thereof and a steel wedge 12 at the base thereof.

In operation, stainless steel disc 5 bonded to glass square 4 through cement 6 is positioned within vice members 2 and 3 and steel wedge 12, in parallel relation to glass square 4, is rested upon disc 5 adjacent the interface between disc 5 and cement 6. Weights of desired denomination are progressively added to platform 11 until failure occurs. The shear strength is then calculated from the load applied.

In the following examples, loading of platform 11 was discontinued when the shear strength calculated therefrom reached 1190 p.s.i. The basis for that action lay in the fact that in the conventional applications wherein metal buttons are sealed to glass, a shear strength of 1000 p.s.i. has been deemed more than satisfactory.

| Sample No. | Treatment | Shear strength (p.s.i.) |
| --- | --- | --- |
| 1 | Held 10 minutes at 30° C | 81.4 |
| 2 | Held 20 minutes at 30° C | 173.2 |
| 3 | Held 30 minutes at 30° C | 244.5 |
| 4 | Held 24 hours at 20° C | 855.6 |
| 5 | Fired at 10° C./minute to 430° C. Held at 430° C. for 30 minutes. Cooled to room temperature at 5° C./minute. | 932.0 |

EXAMPLE II

Seventy-five grams of —200 mesh petalite, 75 grams of —200 mesh spodumene, and 50 grams of —325 mesh calcined $Al_2O_3$ were mixed together for 15 minutes. Fifty grams of Kasil #1 solution were added and blended into the mixture for 15 seconds. A reasonably uniform layer of this mixture of about 1/16" in depth was applied to one facing of stainless steel discs and the coated discs were then placed into contact with the surface of a warm (30° C.) glass square of Corning Code 9041 in like manner to that described above in Example I. The cement appeared dry to the touch in less than 30 seconds. The table below reports various treatments to which different samples were subjected and the shear strength developed in each instance as measured in accordance with the method set out in Example I.

| Sample No. | Treatment | Shear strength (p.s.i.) |
| --- | --- | --- |
| 6 | Held 10 minutes at 30° C | 119.2 |
| 7 | Held 20 minutes at 30° C | 140.0 |
| 8 | Held 30 minutes at 30° C | 183.3 |
| 9 | Held 24 hours at 20° C | 988.0 |
| 10 | Fired at 10° C./minute to 450° C. Held at 450° C. for 30 minutes. Cooled to room temperature at 5° C./minute. | 1,130.6 |

EXAMPLE III

Sixty-six grams of —200 mesh petalite, 33 grams of —200 mesh spodumene, and 1 gram of —325 mesh $BaSO_4$ were mixed together for 15 minutes and, thereafter, 63 grams of Kasil #1 blended therein for about 15 seconds. Seals between stainless steel discs and squares of conventional soda lime glass (Corning Code 0080) were made in like manner to the procedure described above in Example I. The following table sets out the various treatments and results. The cement appeared dry to the touch in less than 15 seconds.

| Sample No. | Treatment | Shear strength (p.s.i.) |
| --- | --- | --- |
| 11 | Held 10 minutes at 40° C | 117.2 |
| 12 | Held 20 minutes at 40° C | 315.0 |
| 13 | Held 30 minutes at 40° C | 284.5 |
| 14 | Held 24 hours at 20° C | [1] 1,190.0 |
| 15 | Fired at 10° C./minute to 450° C. Held at 450° C. for 30 minutes. Cooled to room temperature at 5° C./minute. | [1] 1,190.0 |

[1] No failure.

EXAMPLE IV

Fifty grams of —200 mesh petalite and 50 grams of —200 mesh spodumene were mixed together for 15 minutes and 50 grams of Kasil #88 admixed therewith for about 15 seconds. Seals between stainless steel discs and squares of a conventional borosilicate glass (Corning Code 7740) were fabricated in accordance with the procedure outlined above in Example I. The cement appeared dry to the touch in less than 30 seconds. The table below records various treatments applied thereto and the shear strengths resulting therefrom.

| Sample No. | Treatment | Shear strength (p.s.i.) |
| --- | --- | --- |
| 16 | Held 10 minutes at 40° C | 81.4 |
| 17 | Held 20 minutes at 40° C | 178.2 |
| 18 | Held 30 minutes at 40° C | 255.0 |
| 19 | Held 24 hours at 20° C | 835.0 |
| 20 | Fired at 10° C./minute to 450° C. Held at 450° C. for 30 minutes. Cooled to room temperature at 5° C./minute. | [1] 1,190.0 |

[1] No failure.

EXAMPLE V

One hundred grams of —200 mesh petalite and 10 grams of —200 mesh spodumene were blended together for 15 minutes and 55 grams of Kasil #88 admixed therewith for about 15 seconds. Seals between stainless steel discs and glass squares were produced in like manner with the procedure set out above in Example I. The cement appeared dry to the touch in less than 30 seconds. Various treatments applied to the samples are set out below and the shear strength exhibited in each instance are also reported as measured in accordance with the method illustrated in Example I.

| Sample No. | Treatment | Shear strength (p.s.i.) |
| --- | --- | --- |
| 21 | Held 10 minutes at 30° C | 76.4 |
| 22 | Held 20 minutes at 30° C | 91.5 |
| 23 | Held 30 minutes at 30° C | 142.3 |
| 24 | Held 24 hours at 20° C | [1] 1,190.0 |
| 25 | Fired at 10° C./minute to 450° C. Held at 450° C. for 30 minutes. Cooled to room temperature at 15° C./minute. | [1] 1,190.0 |

[1] No failure.

In each instance, the seal failed at the cement-metal interface.

EXAMPLE VI

One hundred grams of —200 mesh spodumene and 10 grams of —200 mesh petalite were dry-mixed together for 15 minutes and 40 grams of Kasil #88 solution blended therewith for about 15 seconds. Seals between stainless steel discs and glass squares were made according to the procedure reported above with respect to Example I. The cement appeared dry to the touch in less than about 30 seconds. The table below records various treatments to which different samples were subjected and the shear strength measured in like manner to that reported in Example I.

| Sample No. | Treatment | Shear strength (p.s.i.) |
| --- | --- | --- |
| 26 | Held 10 minutes at 30° C | 71.3 |
| 27 | Held 20 minutes at 30° C | 132.3 |
| 28 | Held 30 minutes at 30° C | 224.0 |
| 29 | Held 24 hours at 20° C | [1] 1,190.0 |
| 30 | Fired at 10° C./minute to 450° C. Held at 450° C. for 30 minutes. Cooled to room temperature at 5° C./minute. | [1] 1,190.0 |

[1] No failure.

In each instance, the seal failed at the cement-glass interface.

EXAMPLE VII

Fifty grams of —200 mesh petalite were mixed into 27 grams of Kasil #88 solution for about 15 seconds. Seals between stainless steel discs and glass squares are fabricated in accordance with the practice outlined above in Example I. The cement appeared dry to the touch in less than about 30 seconds. Listed below are various treatments to which different examples were subjected and the shear strengths measured in a manner similar to that reported in Example I.

| Sample No. | Treatment | Shear strength (p.s.i.) |
| --- | --- | --- |
| 31 | Held 10 minutes at 30° C | 61.2 |
| 32 | Held 20 minutes at 30° C | 101.8 |
| 33 | Held 24 hours at 20° C | [1] 1,190.0 |
| 34 | Fired at 10° C./minute to 450° C. Held at 450° C. for 30 minutes. Cooled to room temperature at 5° C./minute. | [1] 1,190.0 |

[1] No failure.

EXAMPLE VIII

Fifty grams of —200 mesh spodumene were blended with 21 grams of Kasil #88 solution for about 15 seconds. Seals between stainless steel discs and glass squares were formed in like manner to the procedure recited above in Example I. The cement appeared dry to the touch in less than about 30 seconds. Various treatments to which the different samples were subjected are tabulated below along with shear strength measurements determined in accordance with the method set forth in Example I.

| Sample No. | Treatment | Shear strength (p.s.i.) |
| --- | --- | --- |
| 35 | Held 10 minutes at 30° C | 50.9 |
| 36 | Held 20 minutes at 30° C | 172.8 |
| 37 | Held 30 minutes at 30° C | 295.0 |
| 38 | Held 24 hours at 20° C | [1] 1,190.0 |
| 39 | Fired at 10° C./minute to 450° C. Held at 450° C. for 30 minutes. Cooled to room temperature at 5° C./minute. | [1] 1,190.0 |

[1] No failure.

EXAMPLE IX

Fifty grams of —200 mesh calcined alumina were mixed with 45 grams of Kasil #88 solution for about 15 seconds. Seals between stainless steel discs and glass squares were made in accordance with the method discussed above in Example I. The cement appeared dry to the touch in not more than about 30 seconds. The table below records various treatments applied to the samples as well as shear strengths determined in accordance with the technique reported in Example I.

| Sample No. | Treatment | Shear strength (p.s.i.) |
| --- | --- | --- |
| 40 | Held 10 minutes at 30° C | 20.9 |
| 41 | Held 20 minutes at 30° C | 71.3 |
| 42 | Held 24 hours at 20° C | 234.0 |

EXAMPLE X

Fifty grams of —200 mesh calcined kaolin were mixed together with 50 grams of Kasil #88 solution for about 15 seconds. Seals between stainless steel discs and glass squares were fabricated according to the technique explained in Example I above. The cement appeared dry to the touch in no more than about 30 seconds. The table below lists various treatments applied to the samples alone with shear strengths measured in accordance with the method discussed above in Example I.

| Sample No. | Treatment | Shear strength (p.s.i.) |
| --- | --- | --- |
| 43 | Held 10 minutes at 30° C | 45.8 |
| 44 | Held 20 minutes at 30° C | 76.4 |
| 45 | Held 24 hours at 20° C | 809.0 |

In each instance, the seal failed at the cement-glass interface.

EXAMPLE XI

Fifty grams of —200 mesh calcined dolomite and 40 grams of Kasil #88 solution were blended together for about 15 seconds. Seals between stainless steel discs and glass squares were formed employing the procedure outlined above in Example I. The cement appeared dry to the touch after less than about 30 seconds. The following table reports several treatments to which the samples were subjected and shear strengths measured thereafter in like manner to that described in Example I.

| Sample No. | Treatment | Shear strength (p.s.i.) |
| --- | --- | --- |
| 46 | Held 10 minutes at 30° C | 35.7 |
| 47 | Held 20 minutes at 30° C | 101.5 |
| 48 | Held 30 minutes at 30° C | 229.0 |
| 49 | Held 24 hours at 20° C | 708.0 |

In each instance, failure occurred at the cement-metal interface.

EXAMPLE XII

Fifty grams of —200 mesh potash feldspar were mixed into 26 grams of Kasil #88 solution for about 15 seconds. Seals between stainless steel discs and glass squares were fabricated utilizing the procedure described above in Example I. The cement appeared dry to the touch after no more than about 30 seconds. The table below lists various treatments which were applied to samples and records measurements of shear strengths obtained in accordance with the technique reported in Example I above.

| Sample No. | Treatment | Shear strength (p.s.i.) |
|---|---|---|
| 50 | Held 10 minutes at 30° C | 45.8 |
| 51 | Held 20 minutes at 30° C | 96.8 |
| 52 | Held 30 minutes at 30° C | 246.0 |
| 53 | Held 24 hours at 20° C | [1] 1,090.0 |

[1] No failure.

An examination of the recited working examples clearly illustrates the parameters of the instant invention. Thus, the need for a combination of petalite and spodumene to insure strong bonding with both glass and metal is demonstrated in Examples VII and VIII where the bonding strength developed when either material is present alone is shown to be less than where a combination of the two ingredients is employed. However, Examples V and VI point out that this combination of ingredients will be satisfactorily operative where the ratio of one component to the other is as great as 10:1. In other words, whereas the strongest bonding to both glass and metal will be achieved when petalite and spodumene are utilized in about equal proportions, adequate bonding can be secured where the ratio therebetween does not exceed about 10:1. Examples IX and XII plainly demonstrate the unique behavior of petalite and spodumene in this invention. Thus, the common refractory fillers recited in these examples do not permit the rapid development of as strong a bond with glass and metal as can be achieved with petalite plus spodumene.

Finally, whereas in each example reported above stainless steel discs were utilized, the operability of the cement of this invention is not limited thereto but is effective with other metals also. For example, strong and rapid bonds have been made with buttons of aluminum, copper, brass, and cold rolled steel.

We claim:
1. A cement for bonding metal to glass which will demonstrate green shear strength of over 75 p.s.i. after drying at about room temperature (20°–40° C.) for no more than about 10 minutes and a shear strength of over about 1000 p.s.i. after firing at temperatures between about 400°–800° C. consisting essentially, by weight, of about 50–85% petalite+spodumene, wherein the ratio of petalite to spodumene ranges between about 10:1–1:10, 5–25% potassium silicate, and 10–40% $H_2O$.

2. A cement according to claim 1 wherein up to 25% by weight of refractory filler materials selected from the group consisting of sand, $Al_2O_3$, zircon, MgO, $ZrO_2$, dolomite, clay, and feldspar are included.

References Cited
UNITED STATES PATENTS 3,228,548   1/1966   Butler _____ 106—53
3,413,132   11/1968  Fishwick _____ 106—40 R ALLEN B. CURTIS, Primary Examiner M. L. BELL, Assistant Examiner U.S. Cl. X.R.
106—84